March 31, 1959 C. N. KIMBERLIN, JR., ET AL 2,880,167
PRODUCTION AND UTILIZATION OF ACTIVATED CARBON CATALYST
Filed June 1, 1954
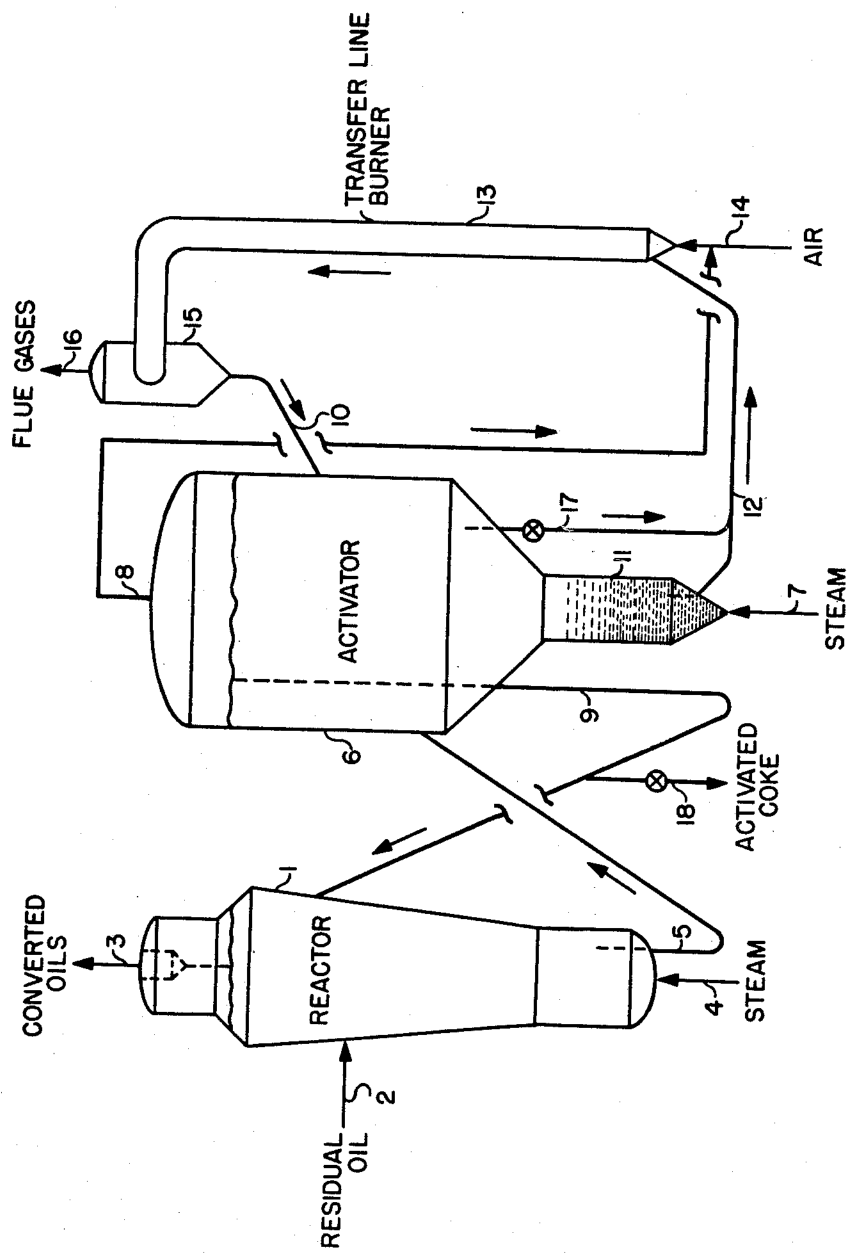

United States Patent Office 2,880,167

Patented Mar. 31, 1959

2,880,167

PRODUCTION AND UTILIZATION OF ACTIVATED CARBON CATALYST

Charles N. Kimberlin, Jr., and Robert W. Krebs, Baton Rouge, La., assignors to Esso Research and Engineering Company, a corporation of Delaware Application June 1, 1954, Serial No. 433,484

4 Claims. (Cl. 208—113)

The present invention relates to a process for preparing particulate activated carbon catalyst characterized by a high surface area per unit weight, e.g., above 100 $m.^2/gm$. It also pertains to an improved process for coking heavy hydrocarbon oils in a fluidized solids system wherein the activated carbon catalyst used during the coking reaction is continuously regenerated and wherein an excess of activated carbon catalyst is produced and removed as product.

A particular feature of the process of this invention is that finely divided inerts are used as heat exchange media in such a manner as to increase the thermal efficiency of the process and to improve the quality and yield of the product activated carbon. The present process is particularly suited to the upgrading of heavy low value petroleum oils boiling above about 900° F. containing constituents non-vaporizable at ordinary pressures without cracking.

It has previously been known to thermally crack petroleum oils such as vacuum residua in a fluid solids system by a process known as fluid coking. In fluid coking, the contact agent or heat carrier used is generally finely divided coke produced in the process that is essentially non-catalytic in its action. This coke usually has a surface area in the order of 0.5 to 4 $m.^2/gm$.

The mechanism of the process of the present invention differs from the prior art fluid coking processes in several respects. First, the present process is catalytic, as it employs an activated carbon catalyst having a high equilibrium surface area in the reaction zone as a contact solid. This catalytic action results in a faster reaction rate, which permits the use of a smaller reactor or a higher feed rate to the same reactor, or alternatively, a lower temperature may be employed during the conversion to increase the yields of middle distillates for further catalytic cracking over siliceous catalysts. As there is a direct relationship between the porosity or surface area of the contact solids and the maximum permissible oil feed rate, the use of activated solids having a high surface area greatly increases the allowable feed rate to the process and therefore greatly increases the efficiency of the process.

This catalytic action of the contact solids also results in improved product distribution and in improved quality of the products. Further, it is known that in conventional catalytic cracking processes the volatile metallic contaminants of the feed are cracked by the catalytic action of the solids. This decomposition of volatile metal compounds inheres to the present process because of its use of a catalyst and results in substantially metal-free distillate oil product.

An object of the present invention is to increase the efficiency and operability of heavy petroleum oil conversion processes. Another object is to produce an activated carbon product having a high surface area, e.g., above 100 $m.^2/gm.$, or surface active properties which may have application as an adsorbent, catalyst or catalyst carrier. A further object is to present the art with an integrated process having as essential features the activation of carbon-containing particulate solids by steam at high temperatures, and use of the combustible gas formed by the activation as a source of heat for the process. A specific object of the present invention is to supply heat to a carbonaceous solids activation zone without direct contact of the carbonaceous solids with free oxygen.

Generally the objects of the invention are accomplished by injecting an oil to be converted into a conversion zone containing particulate activated carbon catalyst at a conversion temperature, whereby the oil is upgraded to lighter vaporous products and deposits carbonaceous residue on the catalyst, reducing the catalyst activity. The deactivated catalyst is circulated to an activation zone wherein it is contacted with steam at a high temperature, preferably temperatures above 1300° F., such that the surface area of the carbon particles is greatly increased and a combustible gas, e.g., water gas, is produced. After activation, the catalyst is recirculated to the conversion zone. The excess of carbon produced during conversion is removed from the activation zone as product. The water gas is circulated to the combustion zone and admixed with a free oxygen-containing gas, e.g., air, and is burned. The heat of this combustion is transferred to heat-carrying finely divided inert solids, e.g., shot. The heated shot resulting from this combustion is circulated to the activation zone and gives up its heat to the activation process. This shot, which is preferably of larger particle size and/or greater density than the coke undergoing activation, is then separated from the coke, preferably by elutriation, and returned to the combustion zone.

As is apparent, this process is independent of outside sources of catalyst and fuel. The required catalyst is obtained by steam activating the coke produced in the cracking reaction. The water gas produced by the steam activation reaction is burned in a circulating shot system to provide heat for the process, e.g., for both the activation and cracking zones.

In the cracking zone the temperature may range from 750° F. to 1800° F. If heavy distillate fuels suitable as feed stocks for further catalytic cracking are desired, the temperature range may be about 750° to 1050° F., preferably about 900° F. to 1000° F. If lighter fuels such as gasoline are desired, the temperature range may be about 1000° F. to 1200° F., preferably about 1000° F. to 1100° F. If chemicals such as olefin gas and aromatic hydrocarbons are desired, the temperature may be in the range of about 1200° F. to 1800° F., preferably about 1400° F. to 1600° F.

The present invention will be further illustrated by the description of the drawing attached to and forming a part of this application. The drawing depicts a preferred embodiment for carrying out the cracking of heavy residual oils and for concurrently producing activated carbon as product. For convenience, the pertinent operating conditions and the reactant feed rates applicable to the process illustrated by the drawing are set forth in a table presented hereinafter.

Referring to the drawing, the oil, which may be suitably preheated, is injected into a reaction vessel 1 by line 2 and contacts the cracking catalyst, e.g., activated coke, depositing carbonaceous residue on the catalyst and evolving lighter hydrocarbon vapors. These vapors are removed by line 3 as product, and may be subjected to further processing such as fractionation, desulfurization, blending, reforming, etc. The heavier portion of the vapors, say, that portion boiling above 900° F., may be recycled to the reactor for further treatment. Steam, or other substantially inert fluidizing gas, is injected into the base of the vessel by line 4 and serves to fluidize the solids therein and also strips the solids in the lower portion of the reactor before they are circulated to the activation vessel, in a manner known by the art.

The catalyst, which has been reduced in activity by coke deposition on it, is removed from the reactor by line 5 and circulated to the activation vessel 6. This vessel contains the solids undergoing treatment in the fluidized state, maintained by steam injected into the base of the vessel by line 7. The steam serves first to elutriate coke from the heat-carrying medium, as is described hereinafter and then fluidizes and reacts with the coke in the upper portion of the vessel. The residence time of the coke in vessel 6 is sufficient to obtain the desired increase in surface area of the coke, i. e., to activate the coke deposits laid down on the catalyst during the cracking reaction so that these deposits then become an integral part of the catalyst. In the activation of the coke deposits by steam, a part of the coke is converted to a gas comprising a mixture of carbon monoxide and hydrogen, e.g., water gas. This water gas is removed overhead by line 8 and is burned, as hereinafter described, to supply heat to the process. Having been activated, the carbon particles are withdrawn from the vessel by line 9 and transferred to the conversion reactor 1.

The activation vessel 6 may be conveniently partitioned or divided by horizontal or vertical baffles, perforated plates, etc., in order to obtain a more efficient activation reaction.

An inert heat carrier or shot is supplied to the upper portion of the activation vessel by line 10. Preferably this shot has a greater free fall velocity than the carbonaceous solids undergoing activation, e.g., has a larger size and/or is denser than the carbon particles. However, in some applications the reverse may be true and the heat-carrying medium would then pass upwardly through the bed and be removed from the activation vessel. As here used, the shot may be any relatively hard inert refractory material such as tabular alumina, mullite, porcelain, quartz, sand, gravel, metal, etc. As shown, the shot settles through the fluid bed to an elutriation zone 11 in the lower portion of the activation vessel and concurrently gives up heat to the carbon particles in the fluid bed. The steam is used to elutriate in the elutriation zone the carbon particles from shot. The shot is then transferred by line 12 to a combustion zone 13. This elutriation zone could, of course, be made separate from the activation vessel. In order to facilitate elutriation, packing may be used in the elutriation zone. Elutriation in a zone of lower solids concentration and higher gas velocity is also efficacious. Other means of separating the particles such as screening may, of course, be used.

The shot and water gas transferred to the combustion vessel, in this example a transfer line burner 13, are admixed with air supplied by line 14. The resulting mixture flows through the transfer line burner at velocities above 10 ft./sec., e.g., 60 ft./sec., while the combustion reaction occurs. This heats the solids to a temperature substantially above the activation temperature in vessel 6, i.e., at least 100° F. above the activation temperature. The heated solids are then removed from the flue gases in cyclone system 15. The flue gases are taken overhead from the cyclone by line 16, and the solids are transferred by line 10 to the activation vessel 6.

Although it is preferred to supply all the heat required by the process by burning the water gas, additional heat may be provided, if desired, by burning substantially completely, a small amount of the activated carbon catalyst. Thus, line 17 can be used to transfer carbon particles from the activation vessel to the transfer line burner. Also, other liquid solids or gaseous fuels may be used if desired to impart heat to the inert heat carrier.

As is customary in the fluid coking of heavy oils, an excess of carbon is produced by the process, and, according to the present invention, this excess of carbon may be removed by line 18 as an activated carbon catalyst of superior quality as compared to the coke product removed from conventional fluid coking processes.

Other methods of processing may be adapted to carry out the teachings of the present invention. Thus, a transfer line reactor similar to transfer line burner 13 may be substituted for reactor 1 or activator 6 and conversely a fluid bed combustion system or gravitating bed system may be substituted for transfer line burner 13. Other variations of this invention will be apparent to those skilled in the art.

Table I summarizes the operating conditions and reactant feed rates applicable to the present invention, and presents a specific example. Table II presents the products obtainable, for the feed stock indicated, from a process operated in accordance with the example of Table I and in the manner shown in the attached drawing.

*Table I*

| | Broad Range | Preferred Range for Liquid Fuels Production | Example |
|---|---|---|---|
| Cracking Conditions: | | | |
| Temperature, °F | 750-1,800 | 900-1,100 | 950 |
| Pressure, p.s.i.a | 0-400 | 0-50 | 15 |
| Oil injection rate, lbs./hr./lb. catalyst in reactor | 1-10 | 2-8 | 5.2 |
| Steam to reactor, wt. percent of feed | 0-100 | 2-25 | 22.6 |
| Catalyst circulation rate, lbs./lb. oil feed | 0.5-10 | 1-5 | 2 |
| Catalyst particle size, microns [1] | 0-1,000 | 40-500 | 40-500 |
| Fresh catalyst surface area, $M^2/gm.$ [2] | 50-1,500 | Above 100 | 200 |
| Average catalyst surface area, $M^2/gm.$ [2] | 25-500 | Above 50 | 150 |
| 650°F.—Conversion per pass [3] | 50-90 | 60-80 | 71.5 |
| Activation Conditions: | | | |
| Temperature, ° F | 1,200-1,800 | 1,300-1,500 | 1,500 |
| Pressure, p.s.i.a | 0-400 | 0-50 | 15 |
| Steam rate, lbs./hr./lb. catalyst circulated | 0.3-10 | 0.5-2 | 1 |
| Average residence time of particles, minutes | ¼-60 | 1-30 | 10 |
| $CO+H_2$ production, s.c.f./lb. steam | 2-20 | 5-15 | 9 |
| $CO/H_2$ ratio | 0.3-1 | 0.4-0.8 | 0.5 |
| Fuel gas heating value, B.t.u./s.c.f. | 200-350 | 280-320 | 300 |
| Heater Conditions: | | | |
| Inert heat carrier— | ---------- | ---------- | Mullite |
| Particle size, microns [1] | 50-1,500 | 200-1,000 | 300-800 |
| Particle density, g./cc | 1-10 | 2-5 | 3.3 |
| Temperature, °F | 1,400-2,100 | 1,600-2,000 | 2,000 |
| Heat Carrier Circulation rate, lbs./lb. catalyst circulated | 1-10 | 1.5-4 | 2 |
| Average residence time of particles in burner, seconds | 1-10 | 2-6 | 4 |
| Air rate, s.c.f./s.c.f. Fuel Gas [4] | 1.5-4 | 2-3 | 2.2 |

[1] By screen analysis.
[2] Measured by nitrogen adsorption at 75° F. by BET method.
[3] 650° F. Conversion equals: 100 vol. percent fresh feed to unit minus vol. percent products boiling below 650° F.
[4] When none of the carbon produced by the process is burnt.

*Table II*

Feed stock:
  South Louisiana vacuum residuum
Inspections:
  1100° F.+ boiling range
  1.55 H/C atomic ratio
  11° API gravity
  17 wt. percent Conradson carbon
  0.48 wt. percent ash at 800° C.
  396 sec. SSF viscosity at 210° F.
Products (percent based on feed):

| | | |
|---|---|---|
| $C_3$ and lighter | wt. percent | 10.9 |
| $C_4$–400° F. (61.2° API) | vol. percent | 28.3 |
| 400°–650° F. (31.0° API) | do | 23.1 |
| 650° F.+ (15.5° API) | do | 28.5 |
| Activated Carbon, surface area of 200 $m.^2/gm$ | wt. percent | 16 |

This invention is not to be limited to the specific process of catalytic cracking of residual oils, as it is capable of enjoying broader applications. For example, other oils such as cycle stocks from cracking with siliceous catalysts, whole crudes, virgin distillate and residual fractions therefrom or mixtures thereof, may also be treated either by themselves or be integrated into the process by using other reaction vessels. Also, naphthas may be reformed to improve their octane number. However, in this case the coke deposits will, in all probability, be too small to make the process self-sustaining with respect to catalyst. The carbon for the production of the catalyst or activated coke may, therefore, be conveniently supplied in the form of extraneous carbonaceous or organic material such as coke from coal or petroleum, coal, wood chips, nut hulls, etc.

It is also apparent that the process of the present invention may be applied to the manufacture of activated carbon for use as such from such carbonaceous starting materials as coal, coke, wood and nut hulls. In this case only the activation vessel and the attendant shot circulation system, including the transfer line burner, would be required.

From the preceding it can be seen that this integration of shot heating technique and the burning of the water gas produced during the activation effects an important improvement in hydrocarbon oil conversion processes. All of the activated carbon made becomes available as a valuable by-product and its quality is improved. This improvement in quality results from the fact that none of the particulate carbon is contacted with oxygen in a heating zone. When the heat-carrying coke is directly burnt to supply heat, the carbon is consumed at a faster rate than the impurities present in the coke, such as sulfur, and the coke by-product is, consequently, of lesser quality.

Having described this invention, what is sought to be protected by Letters Patent is succinctly set forth in the following claims.

What is claimed is:

1. A continuous integrated process for the production and utilization of particulate, activated, carbon catalyst comprising: maintaining in a conversion zone at a conversion temperature mobilized, particulate, carbon catalyst; maintaining in an activation zone at an activation temperature mobilized particulate coke; maintaining in a combustion zone mobilized particulate inert solids having a free fall velocity substantially greater than the free fall velocity of said particulate coke; injecting hydrocarbon oils into said conversion zone to produce hydrocarbon vapors and carbonaceous residue which is deposited on said particulate carbon catalyst thereby reducing the activity of said particulate carbon catalyst; injecting steam into said activation zone to activate said particulate coke in an oxygen-free atmosphere and to produce a combustible gas; circulating said combustible gas to said combustion zone; injecting a free oxygen-containing gas into said combustion zone whereby said combustible gas is burnt thereby heating said particulate inert solids to a temperature substantially above said activation temperature; circulating particulate inert solids so heated from said combustion zone to said activation zone and back to supply heat to particles contained in said activation zone, circulating activated particulate coke having a surface area above 100 m.$^2$/gm. from said activation zone to said conversion zone to supply said particulate carbon catalyst, circulating particulate carbon catalyst along with adhering carbonaceous residue to said activation zone to be activated therein; withdrawing said hydrocarbon vapors as product; and withdrawing activated particulate coke from said activation zone as product of the process.

2. The process of claim 1 when said particular carbon catalyst is in the form of a dense fluidized bed in said conversion zone, when said particulate coke is in the form of a dense fluidized bed in said activation zone, when said particulate inert solids are conveyed through said combustion zone at a velocity above 10 feet per second, and when said particulate coke and said particulate carbon catalyst have a particle size in the range of 0–1000 microns.

3. The process of claim 1 wherein said particulate inert solids comprise a material substantially denser and larger than said particulate coke and said inert solids are separated from said particulate coke by elutriation in the lower portion of said activation zone prior to being recycled to said combustion zone.

4. A continuous improved heavy hydrocarbon oil conversion process which comprises the steps of cracking a heavy oil at a 650° F. conversion in the range of 60 to 80 vol. percent in a conversion zone containing a fluidized bed of activated particulate carbon catalyst having an average surface area above 50 m.$^2$/gm. and maintained at a conversion temperature in the range of 900° to 1100° F. to produce hydrocarbon vapors and coke which is deposited on said catalyst, recovering said vapors as product, withdrawing a portion of said catalyst with fresh deposits of coke from said conversion zone, forming a fluidized bed of the catalyst so withdrawn in an activation zone, activating solids in said activation zone in the absence of free-oxygen by steam treating at an activation temperature in the range of 1300° to 1500° F., a steam rate of 0.5 to 2 lbs./hr./lb. of solid in said activation zone and a time in the range of 1 to 30 minutes to obtain an activated carbon catalyst having a surface area over 100 m.$^2$/gm. and a combustible gas, circulating a portion of the activated carbon catalyst so obtained to said conversion zone at a rate in the range of 1 to 5 lbs./lb. of heavy oil feed to supply fresh cracking surface thereto and to maintain said conversion temperature, withdrawing the remainder of said activated carbon catalyst as product of the process, circulating through said activation zone a particulate inert heat carrier having an initial temperature and a free fall velocity substantially greater than the solids in said activation zone to maintain said activation temperature, recovering said heat carrier in the base of said activation zone, elutriating fine solids therefrom by means of the steam supplied to said activated zone, passing the heat carrier so recovered and said combustible gas to a transfer line burning zone, admixing therewith a free oxygen-containing gas in combustion supporting amounts, passing the resulting burning mixture through said transfer line burning zone at velocities above 10 ft./sec. to heat said heat carrier to a temperature in the range of 1600° to 2000° F., recovering the heat carrier so heated from the flue gases formed by the combustion, and returning said heat carrier to said activation zone.

References Cited in the file of this patent

UNITED STATES PATENTS

| | | |
|---|---|---|
| 2,342,862 | Hemminger | Feb. 29, 1944 |
| 2,376,564 | Upham et al. | May 22, 1945 |
| 2,428,715 | Marisic | Oct. 7, 1947 |
| 2,536,105 | Stuart | Jan. 2, 1951 |
| 2,538,219 | Welty | Jan. 16, 1951 |
| 2,586,889 | Vesterdal et al. | Feb. 26, 1952 |
| 2,600,430 | Riblett | June 17, 1952 |
| 2,687,992 | Leffer | Aug. 31, 1954 |
| 2,719,111 | Adams et al. | Sept. 27, 1955 |
| 2,725,341 | Gornowski et al. | Nov. 29, 1955 |
| 2,763,601 | Martin et al. | Sept. 18, 1956 |